(12) United States Patent  
Mitamura et al.

(10) Patent No.: US 6,650,099 B2
(45) Date of Patent: Nov. 18, 2003

(54) SWITCHING POWER SUPPLY

(75) Inventors: Atsushi Mitamura, Hanno (JP); Hideyuki Ono, Hanno (JP)

(73) Assignee: Shingengen Electric Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/163,451

(22) Filed: Jun. 7, 2002

(65) Prior Publication Data

US 2002/0185996 A1 Dec. 12, 2002

(30) Foreign Application Priority Data

Jun. 7, 2001 (JP) ......................................... 2001-172623

(51) Int. Cl.[7] ............................................... G05F 1/40

(52) U.S. Cl. .................................................... 323/282

(58) Field of Search ................................ 323/282, 283, 323/284, 351, 908

(56) References Cited

U.S. PATENT DOCUMENTS

| 5,617,016 | A | | 4/1997 | Borghi et al. ................ 323/284 |
|---|---|---|---|---|
| 6,222,746 | B1 | * | 4/2001 | Kim ............................. 363/89 |
| 6,307,356 | B1 | * | 10/2001 | Dwelley ...................... 323/282 |
| 6,366,068 | B1 | * | 4/2002 | Morishita .................... 323/282 |
| 6,452,368 | B1 | * | 9/2002 | Basso et al. ................. 323/282 |
| 6,531,854 | B2 | * | 3/2003 | Hwang ........................ 323/285 |

* cited by examiner

Primary Examiner—Adolf D. Berhane
(74) Attorney, Agent, or Firm—Nixon & Vanderhye P.C.

(57) ABSTRACT

The present invention provides a switching power supply capable of limiting power supply output power with a method compatible with reduced size regardless of the modulation system. The present invention is able to provide a compact switching power supply that enables the amount of limitation of power supply output power to be regulated as desired with little inrush current and overshoot particularly in the case of adapting to power supply soft starting by providing a reset device between a switching signal generation device and switching element, applying a reset pulse signal to reset device, and changing the duty of the above reset pulse signal between 0% and 100%.

4 Claims, 3 Drawing Sheets

SWITCHING POWER SUPPLY

BACKGROUND OF THE INVENTION

1. Field of the Invention

The present invention relates to a switching power supply, which can regulate the amount of limitation of power supply output power according to the input or output of the switching power supply and diminish overshoot of inrush current and output voltage during starting.

2. Description of Related Art

Although switching power supplies, which are able to transmit electrical power to a load at an output voltage that differs from the input voltage by performing conventional switching, are becoming the mainstream type of power supply in order to allow reduced size and higher efficiency, since the smoothing circuit has a large capacitance, there has been the problem of device destruction caused by the flow of large inrush current during power supply starting when a charge has not accumulated in the capacitor, as well as the problem of the occurrence of the phenomenon known as overshoot in which output voltage ends up temporarily exceeding the desired voltage.

Therefore, a method referred to as soft starting is employed in which the duty of the signal applied to the switching element during power supply starting is gradually increased to diminish this inrush current and output voltage overshoot, and an example of this prior art is shown in FIG. 2.

The example of the prior art shown in FIG. 2 is a step-down chopper that uses pulse width modulation (to be abbreviated as PWM), and is composed of switching element 1 that generates a pulse voltage by switching the input voltage, smoothing device 2 that smoothes said pulse voltage, detection device 3 that detects power supply output voltage 16, power supply output current 17 or both, switching signal generation device 4 that receives the signal detected by this detection device 3 and generates a drive signal of switching element 1, and soft start circuit 11 that generates a soft start signal.

In addition, in the prior embodiment, switching signal generation device 4 is provided error amplifier 8 that compares power supply output voltage 16 with a reference voltage 14 and transmits a signal in which that error is amplified, and PWM modulator 9 that performs pulse width modulation of the signal transmitted by this error amplifier 8. Moreover, soft start circuit 11 is composed by connecting a constant voltage source like reference voltage 14, resistor 12 and capacitor 13 in series.

The example of the prior art composed in the manner described above operates in the following manner. Power supply output voltage 16 is compared with reference voltage 14, the error amplification signal voltage of those compared voltages is subjected to pulse width modulation by using as the input voltage of PWM modulator 9, switching element 1 is switched according to the output signal of this modulator 9, and the output of this switching element 1 is input to smoothing circuit 2 to be able to obtain power supply output voltage 16.

PWM functions so as to supply large electrical power to the load by increasing the pulse width, namely by increasing the duty, when a large power supply output current 17 is required, and reduce electrical power to the load by decreasing the duty when power supply output current 17 is small.

PWM modulator 9 that performs PWM is composed of a comparator having three inputs for a chopping wave that serves as a reference, an error amplification signal voltage and a soft start signal, and realizes PWM was realized by comparing the signal of the lower voltage valve between the error amplification signal voltage and soft start signal with the chopping wave.

This example of the prior art is equipped with a typical soft start circuit 11, accumulation of charge in the above capacitor begins from the time the power supply is started, and a soft start signal is generated by gradually increasing the voltage of the terminals connecting the above resistor 12 and the above capacitor 13 over an amount of time determined by the product of the value of the above resistor 12 and the value of the above capacitor 13.

However, since the above capacitor 13 typically required a large capacitance on the order of 100 $\mu$F in order to suppress inrush current without allowing overshoot, integration was difficult and there were problems with respect to an increase in the number of parts and impairment of power supply size reduction.

Moreover, in the case of, for example, controlling the power supply by a modulation system different from PWM, there was the problem of being unable to use a method that uses the above three-input comparator.

That is, since the method of the prior art required a large capacitance to generate a soft start signal, it was difficult to reduce the size of the power supply and attain a higher degree of integration, and there was also the problem of not being able to conform to certain power supplies depending on the modulation system used to control the power supply.

SUMMARY OF THE INVENTION

In consideration of the above problems, the object of the invention is to provide a switching power supply that is capable of limiting the power supply output power using a method that is compatible with compact size regardless of the modulation system.

In order to achieve the above object, the invention according to a first aspect of the present invention relates to a switching power supply that is capable of regulating the limit of power supply output power as desired by applying a pulse signal to a switching element that forcibly switches off that switching element according to a signal obtained by detecting the input voltage, output voltage, input current or output current of the power supply.

The switching power supply according to the present invention is provided with a switching element that converts an input voltage to a pulse voltage, the output of this switching element is provided with a smoothing device for smoothing the above pulse voltage, and the output of this smoothing device is composed so as to be connected to a load in the form of the power supply output.

Moreover, the above switching power supply is provided with a detection device that detects the power supply output voltage, power supply output current or both, and is equipped with a switching signal generation device for generating a switching element drive signal according to the detected signal.

The output of the above switching signal generation device is connected to one input of a reset device that is able to switch off the switching element regardless of the signal of the switching signal generation device, and is connected to the switching element.

The other input of the above reset device is connected to the output of a pulse signal generation device that receives a signal from a control signal detection device that detects at least one of input voltage, input current, output voltage or output current, and generates a signal for reset, and is capable of regulating the limit of power supply output power by changing the duty of the above pulse signal.

In addition, the power supply output power limit can also be regulated by inputting a signal that has detected either power supply internal voltage or power supply internal current in the form of a power supply internal signal such as a reference voltage, in addition to the above detection signal, to the above reset device input.

FIG. 3 indicates the relationship among the drive signal of a switching element, pulse signal for resetting, and reset device output signal, and the switching element drive signal drives the switching element as is when the reset pulse signal passes through, while a signal that switches off the switching element is applied to the switching element when the reset pulse signal is reset.

As a result, the maximum value of the duty of the reset device output signal is determined by the duty of the reset pulse regardless of the switching element drive signal, and since that maximum value cannot be equal to or greater than the duty of the reset pulse, the power supply output power can be limited.

In addition, the magnitude of power limitation can be regulated as desired by changing the duty of the reset pulse between 0% and 100%.

For example, soft starting of the power supply can be realized by gradually changing the duty of the reset pulse together with starting of the power supply, and gradually decreasing the amount of power limitation.

Although a pulse signal generation device for realizing the above soft start can be realized by using a resistor and capacitor similar to those of conventional methods, differing from conventional methods, it can also be realized with a simple logic circuit without using a capacitor, thereby enabling a higher level of integration and compact size.

Moreover, since the reset device is provided after the switching signal generation device in the present invention, limitation of output power can be realized regardless of the modulation system within the switching signal generation device.

That is, the present invention allows power supply output power to be regulated regardless of the modulation system used for power supply control by changing the duty of the reset pulse signal, thereby making it possible to provide a compact switching power supply free of inrush current and overshoot.

According to the first aspect of the present invention, the amount of limitation of power supply output power can be regulated by changing the duty of a reset pulse signal applied to a reset device that resets the switching element drive signal, thereby making it possible to provide a compact switching power supply that is free of inrush current and overshoot during starting in the case of adapting to soft starting during power supply starting.

According to the second aspect of the present invention, a switching power supply can be provided that allows power supply output power to be regulated by various modulation systems without being affected by the type of modulation system by providing the reset device after the switching signal generation device output.

According to the invention according to claim 3, a switching power supply can be provided that enables the amount of limitation of power supply output power to be changed gradually in the manner of, for example, a soft start circuit.

DETAIL DESCRIPTION OF THE INVENTION

The following provides an explanation of an embodiment of a switching power supply as claimed in the present invention with reference to the drawings. Furthermore, the same reference symbols are used for the same members in the explanations of the drawings, and duplicate explanations are omitted.

Figure 1:
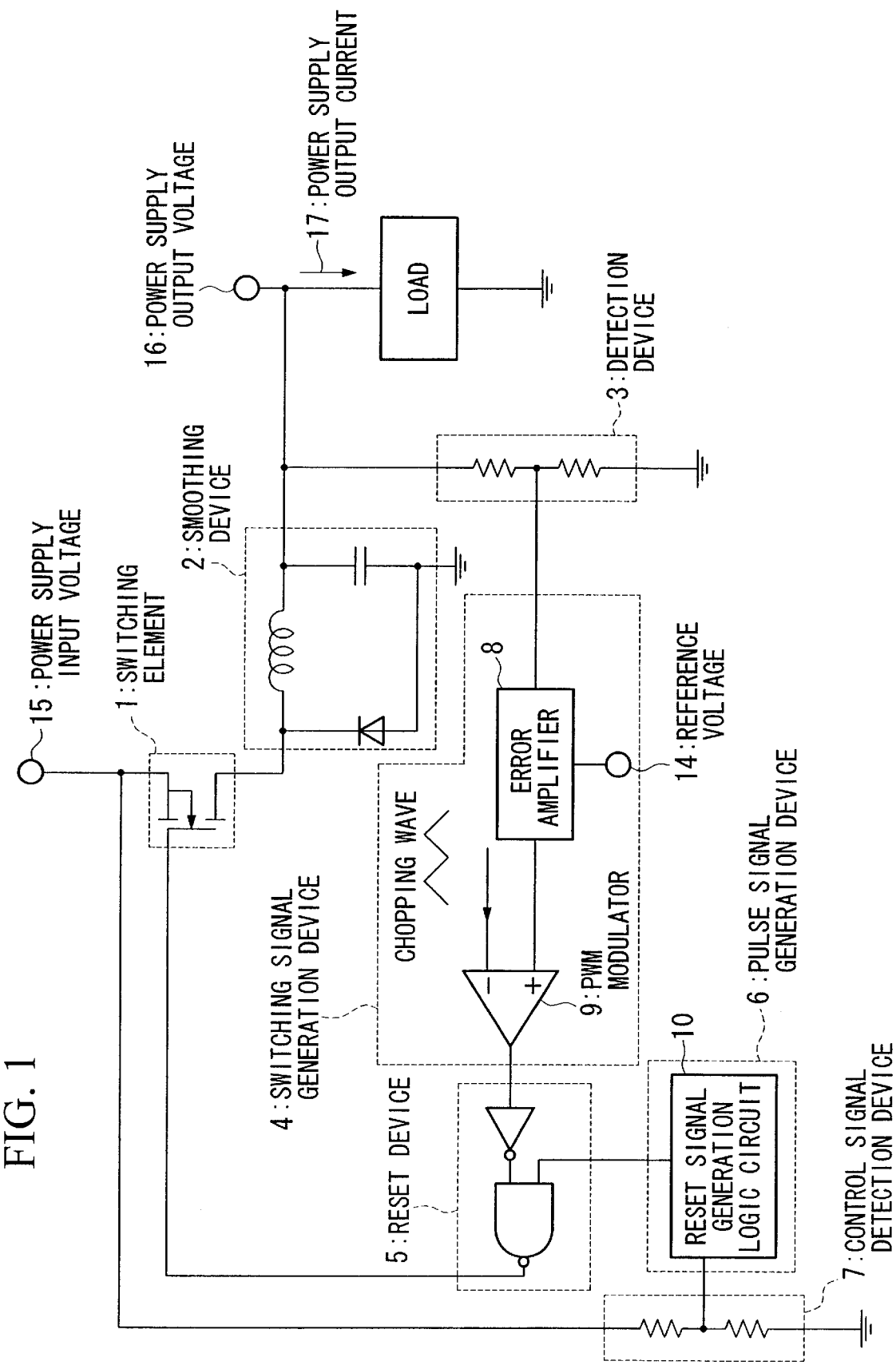
FIG. 1 is a block drawing of one example of an embodiment of the present invention.
Figure 2:
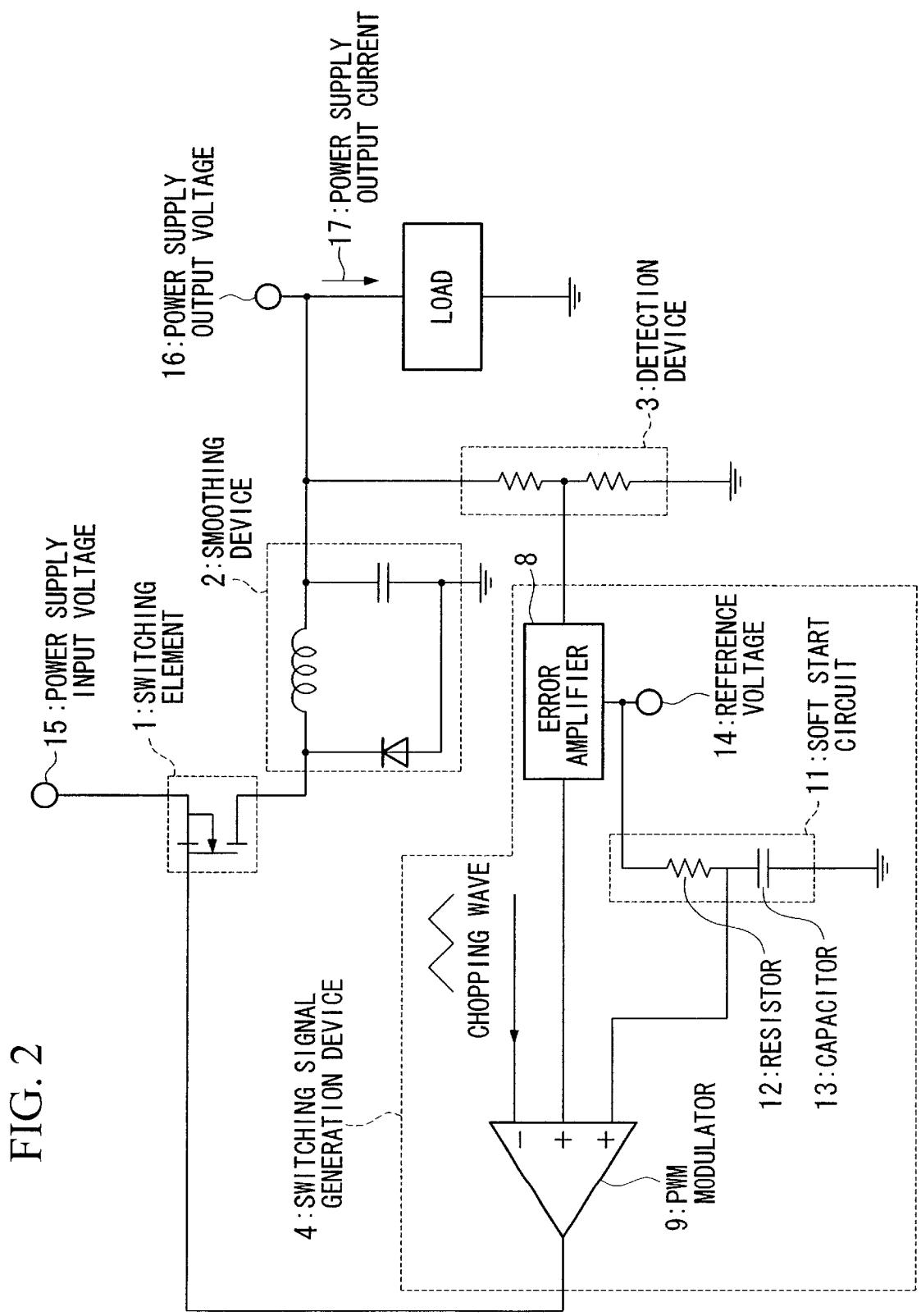
FIG. 2 is a block drawing showing a method of the prior art.
Figure 3:
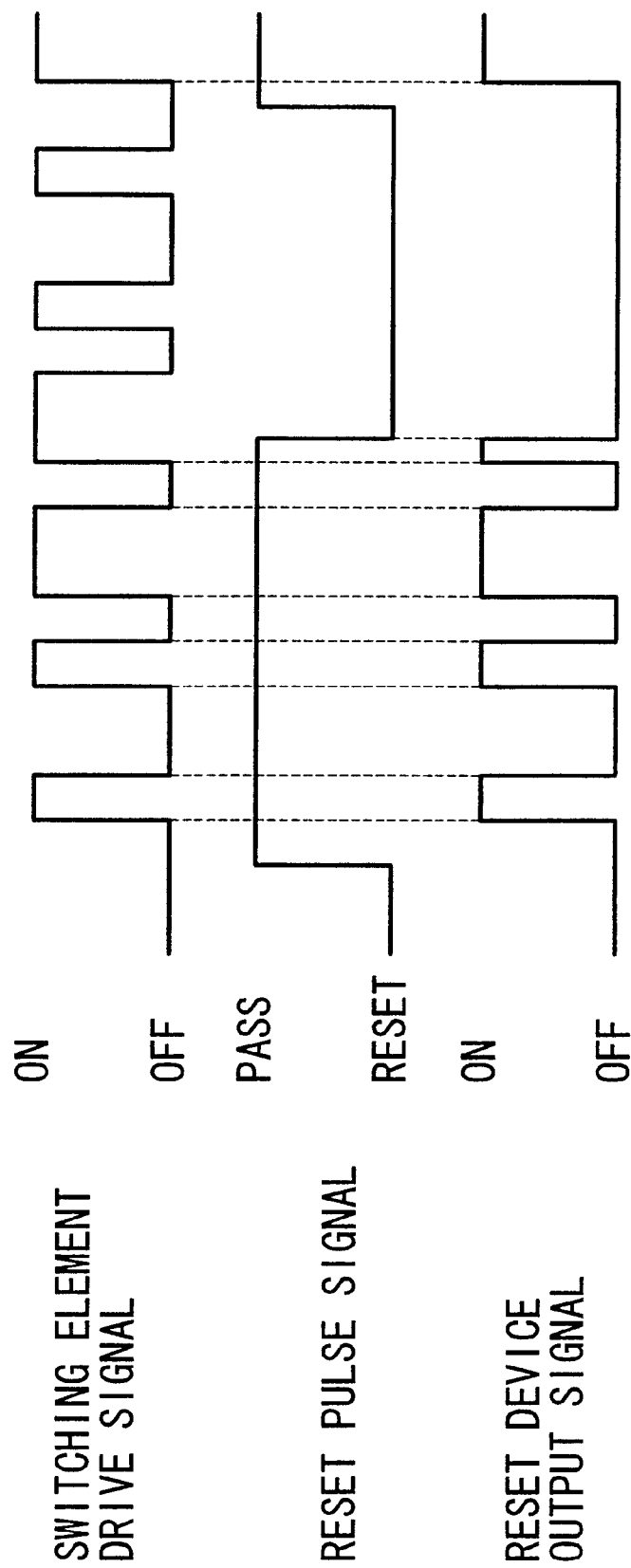
FIG. 3 is a schematic drawing showing the signal of each section.

FIG. 1 shows an embodiment of the present invention, and FIG. 1 is a block drawing of that embodiment. The embodiment of FIG. 1 is a step-down chopper power supply that is a type of switching power supply, and is provided with a switching element 1 that generates a pulse voltage by switching the input voltage, a smoothing device 2 that smoothes the pulse voltage, a detection device 3 that detects output voltage, output current or both, a switching signal generation device 4 that receives a signal detected by the detection device 3 and generates a drive signal of the switching element 1, a reset device 5 that switches off the above switching element 1 by resetting the drive signal, a pulse signal generation device 6 that generates a pulse signal for performing resetting, and a control signal detection device 7 that detects at least one of input voltage, input current, output voltage or output current in order to obtain a signal for controlling this pulse signal generation device 6.

In addition, in the present embodiment, error amplifier 8, which compares power supply output voltage 16 and reference voltage 14 and then transmits a signal in which that error is amplified, and PWM modulator 9, which performs pulse width modulation on the signal transmitted by this error amplifier 8, are provided in switching signal generation device 4.

As a result of having the above constitution, the switching power supply of the present invention operates in the manner described below. Power supply output voltage 16 is compared with reference voltage 14, and the signal in which that error has been amplified is subjected to pulse width modulation as the input voltage of PWM modulator 9 followed by sending of the switching element drive signal to the input of reset device 5.

In the case a reset signal is not input to reset device 5, switching element 1 is switched by the output signal of PWM modulator 9, and a constant voltage output can be obtained by inputting the output of this switching element 1 to smoothing circuit 2.

On the other hand, a signal from control signal detection device 7 that detects power supply input voltage 15 is input to reset signal generation logic circuit 10 provided in reset device 5, enabling a reset signal to be generated according to the input voltage.

The present embodiment is composed so that the amount of limitation of power supply output power is regulated as desired by pulse signal generation device 6 receiving a signal from control signal detection device 7 that detects a signal like that of power supply input voltage 15, and generating a pulse signal for which the duty is between 0% and 100%, thereby making it possible to gradually change the amount of limitation of power supply output power in the manner of, for example, a soft start circuit.

For example, soft starting can be realized by detecting starting of the power supply from control signal detection device 7, gradually changing the reset signal applied to reset device 5 from a signal having a large reset duty to a signal having a small reset duty in reset signal generation logic circuit 10 in accordance with starting of the power supply, and then reducing the reset duty to 0% when starting is completed.

Furthermore, although power supply output voltage 16 is detected in control signal detection device 7 in the embodiment shown in FIG. 1, similar effects can also be obtained by detecting either the voltage or current signal of power supply input or output, and in the present embodiment, in addition to the input and output of the power supply, effects can be obtained that are similar to the case of detecting power supply output voltage 16 even if a power supply internal signal such as the output voltage of error amplifier 8 is used.

That is, in the present invention, input voltage, input current, output voltage and output current include not only the input and output of the power supply, but also that within the power supply.

Moreover, a power supply output abnormality protection circuit can also be composed by detecting a power supply output abnormality by detecting output current or output voltage, generating a reset signal that is applied to reset device 5 in accordance with the above abnormality detection signal with pulse signal generation device 6, and regulating limitation of power supply output power with reset device 5.

In the present embodiment, the input of reset device 5 is connected to the output of switching signal generation device 4, while the output of the above reset device 5 is connected to switching element 1.

In this manner, by providing reset device 5 after the output of switching signal generation device 4, power supply output power can be regulated using various modulation systems without being affected by the type of modulation system used.

What is claimed is:

1. A switching power supply comprising:
   a switching element that generates a pulse voltage by switching an input voltage,
   a smoothing device that smoothes said pulse voltage;
   a detection device that detects an output voltage, output current or both;
   a switching signal generation device that receives a signal detected by said detection device and generates a drive signal of said switching element;
   a reset device that switches off said switching element by resetting said drive signal;
   a pulse signal generation device that generates a pulse signal for performing that reset; and
   a control signal detection device that detects at least one of input voltage, input current, output voltage or output current to obtain a signal for controlling said pulse signal generation device.

2. The switching power supply according to claim 1 wherein, the output of said switching signal generation device is connected to the input of said reset device, and the output of said reset device is connected to said switching element.

3. The switching power supply according to claim 1 wherein, said pulse signal generation device generates a pulse signal having a duty of between 0% and 100% by receiving a signal from said control signal detection device, and is composed so as to generate a signal having a large duty in the case of desiring to limit the output power of the power supply by a large amount, or generate a signal having a small duty in the case of desiring to limit the output power of the power supply by a small amount.

4. The switching power supply according to claim 2 wherein, said pulse signal generation device generates a pulse signal having a duty of between 0% and 100% by receiving a signal from said control signal detection device, and is composed so as to generate a signal having a large duty in the case of desiring to limit the output power of the power supply by a large amount, or generate a signal having a small duty in the case of desiring to limit the output power of the power supply by a small amount.

* * * * *

UNITED STATES PATENT AND TRADEMARK OFFICE
CERTIFICATE OF CORRECTION

PATENT NO. : 6,650,099 B2
DATED : November 18, 2003
INVENTOR(S) : Mitamura A. et al.

It is certified that error appears in the above-identified patent and that said Letters Patent is hereby corrected as shown below:

<u>Title page,</u>
Item [73], should read -- Shindengen Electric Manufacturing Co., Ltd., Tokyo (JP) --

Signed and Sealed this

Sixteenth Day of March, 2004

JON W. DUDAS
*Acting Director of the United States Patent and Trademark Office*